(12) United States Patent
Bae

(10) Patent No.: US 12,423,390 B2
(45) Date of Patent: Sep. 23, 2025

(54) METHOD AND SYSTEM FOR STORING AND VERIFYING WEB PAGES BY USING A BLOCKCHAIN NETWORK

(71) Applicant: AIDB CO., LTD., Seoul (KR)

(72) Inventor: Sukmin Bae, Seoul (KR)

(73) Assignee: AIDB CO., LTD., Seoul (KR)

( * ) Notice: Subject to any disclaimer, the term of this patent is extended or adjusted under 35 U.S.C. 154(b) by 320 days.

(21) Appl. No.: 18/561,462

(22) PCT Filed: Jan. 29, 2021

(86) PCT No.: PCT/KR2021/001179
§ 371 (c)(1),
(2) Date: Nov. 16, 2023

(87) PCT Pub. No.: WO2022/131441
PCT Pub. Date: Jun. 23, 2022

(65) Prior Publication Data
US 2024/0202291 A1    Jun. 20, 2024

(30) Foreign Application Priority Data
Dec. 18, 2020 (KR) .................. 10-2020-0179076

(51) Int. Cl.
*G06F 21/12* (2013.01)
(52) U.S. Cl.
CPC .................. *G06F 21/128* (2013.01)
(58) Field of Classification Search
CPC ..................................... G06F 21/128
(Continued)

(56) References Cited

U.S. PATENT DOCUMENTS

2014/0359411 A1* 12/2014 Botta .............. G06F 40/197
715/205
2016/0110377 A1* 4/2016 Yun ................. H04L 63/08
707/626
(Continued)

FOREIGN PATENT DOCUMENTS

KR    10-1761513 B1    7/2017
KR    10-1892537 B1    8/2018
(Continued)

OTHER PUBLICATIONS

"Request for the Submission of an Opinion" Office Action issued in KR 10-2020-0179076; mailed by the Korean Intellectual Property Office on Feb. 16, 2021.
(Continued)

*Primary Examiner* — Michael S McNally
(74) *Attorney, Agent, or Firm* — Studebaker Brackett PLLC

(57) ABSTRACT

The purpose of the present disclosure is to provide a method and system capable of storing the contents of a web page not to be forged or falsified and confirming the stored contents at a later time. To this end, the present disclosure provides a platform that stores a web page not to be forged or falsified by using a blockchain network, an external file storage, and a hash function and enables whether or not the web page is changed to be verified at a later time. In detail, the present disclosure provides a method and system capable of calculating a web page-related hash value, storing the calculated web page-related hash value in a blockchain network, when verification is needed, comparing a current web page-related hash value with a previously stored web page-related hash value, and confirming whether or not contents within the web page are changed.

9 Claims, 13 Drawing Sheets

(58) Field of Classification Search
USPC .............................................................. 726/4
See application file for complete search history.

(56) References Cited

U.S. PATENT DOCUMENTS

| | | | | |
|---|---|---|---|---|
| 2018/0025181 | A1* | 1/2018 | Barinov | G06F 21/645 |
| | | | | 726/26 |
| 2018/0137196 | A1* | 5/2018 | Han | G06F 16/9535 |
| 2020/0193061 | A1* | 6/2020 | Pham | G06F 21/6263 |
| 2021/0092130 | A1* | 3/2021 | Li | G06F 21/563 |
| 2021/0149974 | A1* | 5/2021 | Yang | H04L 9/0618 |

FOREIGN PATENT DOCUMENTS

| | | |
|---|---|---|
| KR | 10-2019-0099816 A | 8/2019 |
| KR | 10-2032780 B1 | 10/2019 |
| KR | 10-2020-0101512 A | 8/2020 |

OTHER PUBLICATIONS

"Written Decision on Registration" Office Action issued in KR 10-2020-0179076; mailed by the Korean Intellectual Property Office on Apr. 2, 2021.

International Search Report issued in PCT/KR2021/001179; mailed Sep. 3, 2021.

* cited by examiner

FIG. 10

METHOD AND SYSTEM FOR STORING AND VERIFYING WEB PAGES BY USING A BLOCKCHAIN NETWORK

CROSS-REFERENCE TO RELATED APPLICATIONS

The present application is a PCT national stage of International Patent Application No. PCT/KR2021/001179, filed on Jan. 29, 2021, which is based upon and claims the benefit of priority to Korean Patent Application No. 10-2020-0179076 filed on Dec. 18, 2020. The disclosures of the above-listed applications are hereby incorporated by reference herein in their entirety.

TECHNICAL FIELD

The present disclosure relates to a method and system for storing and verifying web pages by using a blockchain network. In particular, the present disclosure relates to a method and system for detecting whether or not a web page is changed, by comparing and verifying a current web page and a web page stored through a blockchain network.

BACKGROUND ART

Thanks to the development of devices and various types of security tools, transactions on the Internet have now reached a sharing economy platform between individuals beyond simple goods sales or reservation services. However, despite the introduction of systems to prevent damage to service users, such as payment services with enhanced security and safe transactions, current Internet transactions have the following issues.

First, when web pages are changed after transactions are contracted, changed services or products may be different from services or products expected by users at the time of transaction contracts, and the users may suffer damage as a result. FIG. 1 illustrates that a web page confirmed by a service user at the time of a contract and a web page at the time of execution of the contract are changed.

To prevent the issues described above, a user may capture and store a web page at the time of contracting a transaction, but web content may be edited and captured by using a developer tool of an Internet browser, or may be easily edited by using a graphic tool after capture. Therefore, when an issue occurs in an actual transaction, resolving the issue between transaction parties by using a captured image is not easy.

Second, although share economy platforms rapidly increase during transactions on the Internet, users do not repeatedly trade with the same service provider, and thus, verification of service providers may not be easy. In other words, in general, in the case of share economy platform transactions, even when transactions are made several times on one platform, service providers continue to be changed. Accordingly, users do not trust contents of services.

Third, at the time of a transaction on the Internet, service providers may update web pages at any time, but users may not query content before the update.

SUMMARY

The purpose of the present disclosure is to provide a method and system capable of storing the contents of a web page not to be forged or falsified and confirming the stored contents afterwards.

According to an aspect of embodiments according to the technical spirit of the present disclosure, a method of storing a web page by using a blockchain network includes: receiving, from a first user at a first time, a URL of a web page that the first user wants to store; downloading a first HTML file of the web page corresponding to the URL received from the first user, and generating a first image file by rendering the web page through a headless browser; temporarily storing the first HTML file and the first image file together with a first timestamp; hashing each of the first HTML file and the first image file, and generating a total hash value; storing the first HTML file and the first image file in an external file storage by using the total hash value; and storing, in the blockchain network, first transaction data including a hash value of the first HTML file, a hash value of the first image file, a file storage path, the first timestamp, the URL, and the total hash value.

According to a further example of the method, the first HTML file and the first image file may not be stored in the blockchain network.

According to a further example of the method, the total hash value may be generated by using a tree together with the hash value of the first HTML file, the hash value of the first image file, the file storage path, the first timestamp, and the URL.

According to a further example of the method, the storage method may further include: receiving the total hash value from a second user at a second time after the first time; after receiving the total hash value from the second user, querying first transaction data corresponding to the total hash value from the blockchain network, and receiving the first transaction data from the blockchain network; and importing the first HTML file and the first image file from the external file storage by using the file storage path and the total hash value which are included in the received first transaction data, and displaying the imported first HTML file and first image file to the second user.

According to a further example of the method, the method may further include: receiving the total hash value from a second user at a second time after the first time; after receiving the total hash value from the second user, querying first transaction data corresponding to the total hash value from the blockchain network and receiving the first transaction data from the blockchain network; in the case where the first transaction data is received from the blockchain network, downloading a second HTML file of the web page corresponding to a URL of the received first transaction data, and generating a second image file by rendering the web page through a headless browser; temporarily storing the second HTML file and the second image file together with a second timestamp; hashing each of the second HTML file and the second image file; comparing a hash value of the second HTML file and a hash value of the second image file, respectively, with the hash value of the first HTML file and the hash value of the first image file of the received first transaction data; and displaying a result of the comparison of the hash values to the second user.

According to a further example of the method, the method may further include: importing the first HTML file and the first image file from the external file storage by using a file storage path and a total hash value which are included in the received first transaction data; comparing the first HTML file and the first image file imported from the external file storage with the second HTML file and the second image file; and displaying a result of the comparison between the HTML files and the image files to the second user, wherein the comparison between the first image file and the second image file is performed via a deep learning model.

According to a further example of the method, the total hash value may be generated by using a tree together with the hash value of the first HTML file, the hash value of the first image file, the file storage path, the first timestamp, the URL, and a verification status value, the first transaction data stored in the blockchain network may further include the verification status value, before receiving the first transaction data from the blockchain network, the verification status value within the first transaction data may be first received from the blockchain network, in the case where the verification status value is TRUE, an operation of receiving the first transaction data from the blockchain network is performed, and in the case where the verification status value is FALSE, the operation of receiving the first transaction data from the blockchain network is not performed.

According to a further example of the method, the method may further include: after generating the total hash value, generating a status change hash value by salting the total hash value with a random number and then hashing the total hash value; and transmitting the total hash value and the status change hash value to the first user, wherein the status change hash value is used to change the verification status value.

According to a further example of the method, the first user and the second user may be same or different users, and may be a person who provides a service through the web page, a person who uses a service within the web page, or an external verifier.

According to a further example of the method, the method may further include, before hashing the first HTML file and the first image file, displaying the first HTML file and the first image file to the first user and requesting confirmation of the first HTML file and the image file.

According to a further example of the method, the method may further include performing after the first time periodically: downloading a third HTML file of the web page corresponding to the URL, and generating a third image file by rendering the web page through a headless browser; temporarily storing the third HTML file and the third image file together with a third timestamp; hashing each of the third HTML file and the third image file; querying first transaction data corresponding to the total hash value from the blockchain network and receiving the first transaction data from the blockchain network; comparing a hash value of the third HTML file and a hash value of the third image file, respectively, with the hash value of the first HTML file and the hash value of the first image file within the first transaction data; and when the hash value of the first HTML file and the hash value of the third HTML file are not the same as each other, or the hash value of the first image file and the hash value of the third image file are not the same as each other, notifying the first user of a hash value mismatch.

According to another aspect of the embodiments according to the technical spirit of the present disclosure, a system for storing a web page by using a blockchain includes: a management server performing the method; a blockchain network; and an external file storage.

According to embodiments of the present disclosure, a web page may be stored not to be forged or falsified by using a blockchain network, and thus, records, which may be trusted between contracting parties, may be stored.

In addition, according to the embodiments of the present disclosure, a decrease in an invoke/query speed of a transaction may be prevented by storing an HTML file and image file of the web page in an external file storage rather than in a blockchain network.

According to the embodiments of the present disclosure, a user and a verifier may use a data and content forgery or falsification prevention platform according to the embodiments of the present disclosure without membership registration, login, or other authentication procedures, and accordingly, a risk of personal information leakage may be eliminated.

BRIEF DESCRIPTION OF THE FIGURES

FIG. 10 illustrates an example of a web page comparison and verification result that is displayed to a second user by using the methods of FIGS. 8 and 9.

DETAILED DESCRIPTION

Figure 1:
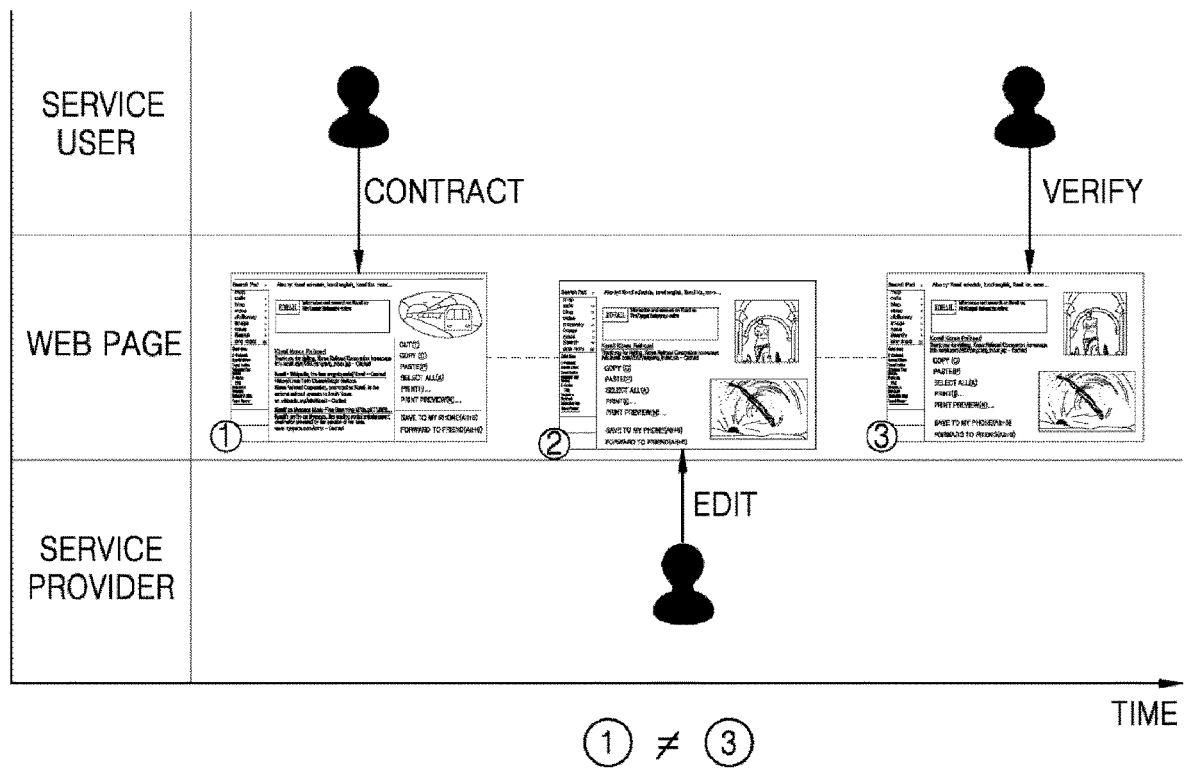
FIG. 1 illustrates that a web page confirmed by a service user at the time of a contract and a web page at the time of execution of the contract are changed.

The purpose of the present disclosure is to provide a method and system capable of storing the contents of a web page not to be forged or falsified and confirming the stored contents afterwards.

To this end, the present disclosure provides a platform that stores a web page not to be forged or falsified by using a blockchain network, an external file storage, and a hash function, and then enables whether or not the web page is changed to be verified. In detail, the present disclosure provides a method and system capable of calculating a web page-related hash value, storing the calculated web page-related hash value in a blockchain network, when a verification is needed, comparing a current web page-related hash value with a previously stored web page-related hash value, and confirming whether or not content within the web page is changed.

Hereinafter, the details for implementing the disclosure are described in detail with reference to the attached drawings. However, in the following description, the detailed descriptions of well-known functions or configurations, which may unnecessarily obscure the gist of the present disclosure, are omitted.

In the accompanying drawings, the same or corresponding components are given the same reference numerals. Also, in the description of the following embodiments, the same descriptions of the same or corresponding components may be omitted. However, even when the descriptions of the components are omitted, it is not intended that the components are not included in any embodiment.

Aspects of the embodiments are described below with reference to schematic flowcharts and/or schematic block diagrams of methods and systems according to embodiments. It will be understood that each block of the schematic flowcharts and/or schematic block diagrams, and combinations of blocks in the schematic flowcharts and/or schematic block diagrams, may be implemented by code. The code may be provided to a processor of a general-purpose computer, a special-purpose computer, or another programmable data processing device, so that instructions executed via the processor of the computer or the other programmable data processing device may create a machine to generate a means for implementing functions/operations specified in the schematic flowcharts and/or schematic block diagrams.

In addition, it should be noted that in some alternative implementations, functions shown in a block may occur in a different order than that shown in the drawings. For example, according to the functionality involved, two blocks shown in succession may be actually executed substantially simultaneously, or the blocks may sometimes be executed in reverse order. At least one block of the illustrated drawings, or other operations and methods, which are equivalent in functions, logic, or effects of portions thereof, may be conceived.

In various embodiments, a disclosed web page storage system and method may be based on various types of blockchains, according to who may participate in a network, execute a consensus protocol, and maintain a shared blockchain ledger. Various types of blockchains may include, for example, a public blockchain, a consortium blockchain, a private blockchains, and the like. The following description refers to the private blockchain. However, the disclosed web page storage system and method may also be applied to other types of blockchains.

The invention according to the present disclosure may store a web page not to be forged or falsified by using a blockchain network, and thus, may be used in various platforms such as fake news, malicious comments, and transactions on the Internet. However, hereinafter, for convenience of description, the description is limited to a transaction on the Internet.

Figure 2:
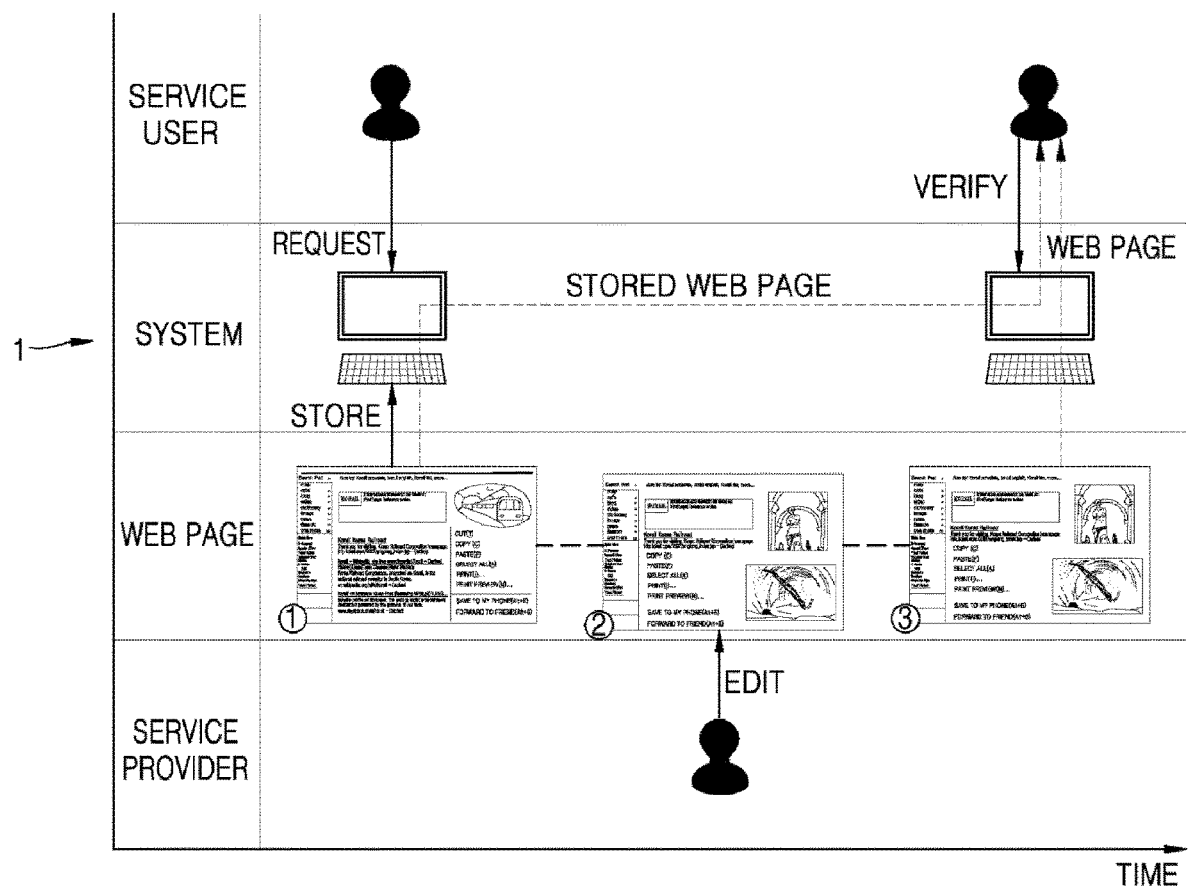
FIG. 2 schematically illustrates a data and content forgery or falsification prevention platform within a web page, which uses a system according to embodiments of the present disclosure.

FIG. 2 schematically illustrates a data and content forgery or falsification prevention platform within a web page, which uses a system according to embodiments of the present disclosure.

A system 1 of the present disclosure is configured to store a web page at the time of a contract between a service user and a service provider, or upon a request of the service user. In other words, according to the present disclosure, a third party (i.e., the system 1) may store the web page rather than the service user or service provider directly storing the web page, so that trustworthy evidence of a transaction may be collected. The web page may be stored in a way that may not be forged or falsified. Afterwards, the system 1 may confirm whether or not data and content within the web page are changed, by comparing a current web page with a stored web page. The system 1 stores the web page in a way that may not be forged or falsified, and thus, a result of comparison between a web page confirmed by the service user at the time of the contract and a web page at the time of execution of the contract is trustworthy.

Figure 3:
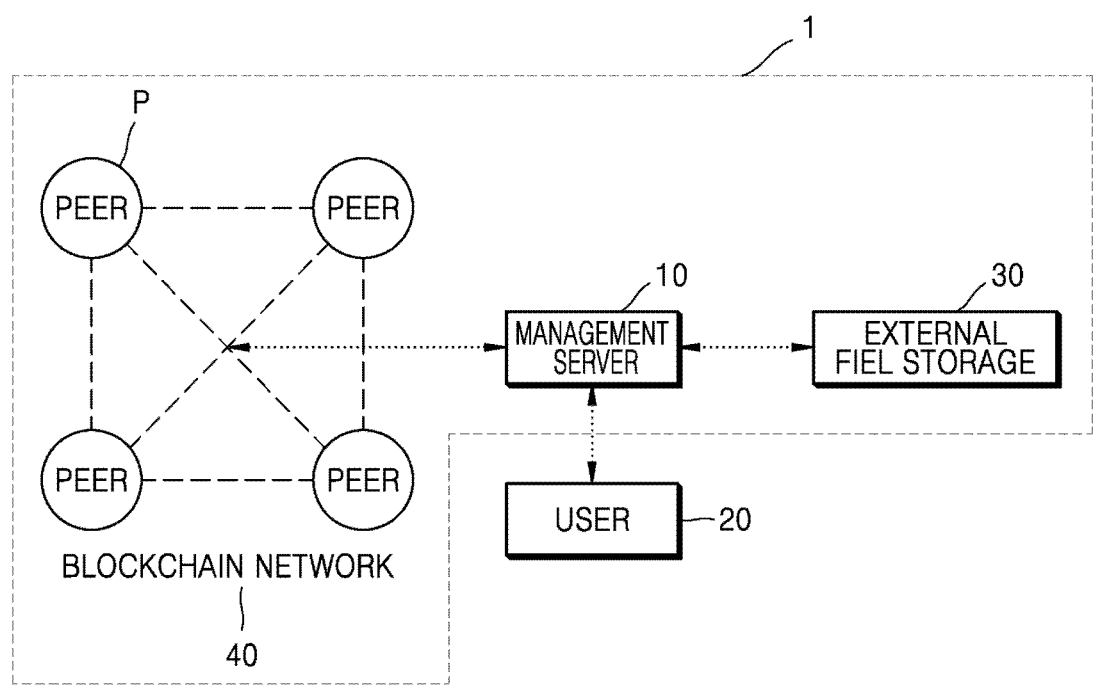
FIG. 3 is a block diagram illustrating a configuration of a system for storing and verifying a web page, according to embodiments of the present disclosure.

FIG. 3 is a block diagram illustrating a configuration of a system for storing and verifying a web page by using a blockchain, according to an embodiment of the present disclosure.

FIG. 3 illustrates a configuration of a system 1 used in the data and content forgery or falsification prevention platform within the web page of FIG. 2. The system 1 includes a management server 10, an external file storage 30, and a blockchain network 40.

A blockchain may be generally divided into a public blockchain over which all users are permitted to have access authority and in which generation of a transaction is enabled, and a private blockchain to which only permitted or authorized users may have access and in which generation of a transaction is also restricted. The public blockchain may enable anyone to participate in, may use a method of recording as a block through a distributed consensus on transaction generation, and thus may distribute and manage data at high reliability and transparency. In contrast, the public blockchain takes a lot of cost and time to generate and share a block. To solve the issue described above, the system 1 according to the present embodiment establishes the private blockchain-based network 40 (hereinafter referred to as a blockchain network 40), which has a fast speed and is efficient, by recording, as a block, only a transaction by a limited number of nodes. However, as described above, the blockchain network 40 may be based on other types of blockchains.

In an embodiment, the blockchain network 40 may also be based on Hyperledger Fabric. The Hyperledger Fabric may optimize network performance by separating chain code execution and transaction ordering. Also, the Hyperledger Fabric may operate a trusted blockchain network on the basis of a participant and regulatory oversight known as permissioned membership and thus is highly confidential. In actual, in the Hyperledger Fabric, the chain code is hosted by a peer. When an application creates a transaction, only a designated peer executes and signs the transaction. After receiving a transaction proposal of the application, each endorsing peer calls and independently executes the chain code referred to by the transaction.

The blockchain network 40 may include two or more peers P. In the present embodiment, the blockchain network 40 includes four peers P, but the present disclosure is not limited thereto.

The peer P may form a Hyperledger Fabric network. The peer P may store a blockchain, and maintain and manage a ledger. All the peers P, which participate in the blockchain network 40, each store and manage the same ledger and each verify validity or authenticity of a transaction that is newly generated, on the basis of the corresponding ledger. According to the result of the verification, respective transactions under a certain condition, which are consented as verified between the peers P, are bundled into one block and stored, the corresponding block is propagated to all the peers P and connected in the form of being appended to the back of a previous block, and blockchains stored in all the peers P are updated by repeating the process. In a blockchain, front and back blocks are connected by a hash value, and also, only a transaction consented between the peers P are stored in the blocks, and thus, for malicious purposes, forging or falsifying information stored in the blocks or manipulating the transaction may not be technically available. Therefore, by using the above characteristics, the system 1 may store a transaction for a web page in a blockchain of the peer P to prevent forgery or falsification of the transaction.

The management server 10 may be configured to establish and manage the blockchain network 40. The management server 10 may be configured to transmit the transaction related to the web page to the blockchain network 40 to store the transaction in the blockchain network 40.

The management server 10 may be configured to control the external file storage 30. The management server 10 may store one or more files in the external file storage 30 and import one or more files from the external file storage 30.

In an embodiment, the management server 10 may provide an application to a system user 20 by using a Hyperledger Fabric software development kit (SDK). Via the application mentioned above, the user 20 may request web page storage and verification and confirm a web page verification result. Via the application, the management server 10 may receive the request from the user 20 and transmit a verification result to the user 20.

The system user 20 may be a user who wants to store a web page or a verifier who wants to verify a web page, by using the system 1.

The external file storage 30 may be configured to store an HTML file and/or an image file. In detail, the external file storage 30 may store an HTML file of a web page and/or an image file obtained by rendering the web page. A detailed description of a total hash value of the web page is given below.

Figure 4:
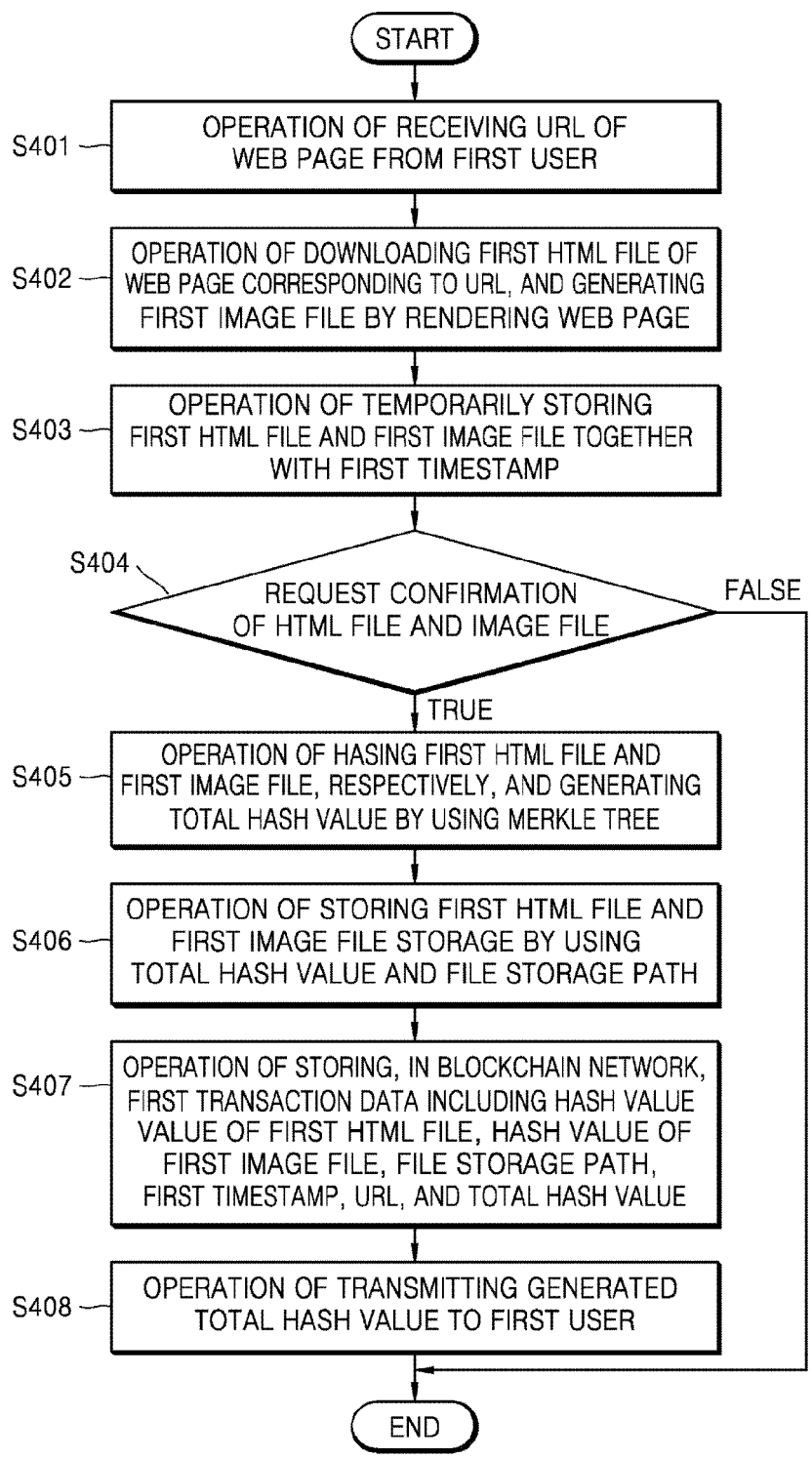
FIG. 4 is a flowchart of a method of storing a web page, according to embodiments of the present disclosure.

FIG. 4 is a flowchart of a method of storing a web page, according to embodiments of the present disclosure. The web page storage method of FIG. 4 may be performed by the management server 10 by using the blockchain network 40 of FIG. 3.

First, operation S401 of receiving, from a first user at a first time, a URL of a web page that the first user wants to store may be performed. In an embodiment, the first user may input the URL of the web page through an application provided by the management server 10, and the management server 10 may receive the URL through the application. In an embodiment, the first user may input an email address or phone number via which a storage save result and/or verification result of the web page are to be received, in addition to the URL of the web page.

Next, operation S402 of downloading a first HTML file of the web page corresponding to the URL received from the first user and generating a first image file by rendering the web page through a headless browser may be performed. The web page includes HTML, CSS, and JavaScript, the HTML has the content and structure of the web page, but the content may be modified/deleted/added via the CSS or JavaScript, and thus, generating together a rendered image of the web page may be desirable from a reliability perspective. As described above, the management server 10 may directly extract an HTML source and directly render an image, and thus, more reliable evidence than when the user and/or verifier simply screen-captures the web page may be collected.

Next, operation S403 of temporarily storing the first HTML file and the first image file together with a first timestamp may be performed. The first timestamp may indicate a time at which the HTML of the web page is downloaded and/or a time at which the first image file is generated by rendering the web page and/or a time at which the first HTML file and the first image file are temporarily stored. In an embodiment, the management server 10 may temporarily store the URL of the web page in addition to the first HTML file, the first image file, and the first timestamp.

After operation S403, operation S404 of requesting confirmation of the first HTML file and the first image file from the first user may be performed. In an embodiment, the management server 10 may output (e.g., display) the first HTML file and the first image file to the first user and request confirmation of whether or not the first HTML file and the first image file are for the web page requested by the first user. The output and/or confirmation request may be performed, for example, through an application provided by the management server 10. By operation S404, the first user may confirm the first HTML file and the image file. However, for simplicity of a procedure, present operation S404 may be omitted.

In response to the confirmation request, an answer (TRUE) indicating that the first HTML file and the first image file are for the desired web page, or an answer (FALSE) indicating that the first HTML file and the first image file are not for the desired web page may be received from the first user. In the case where TRUE is received, next operation S405 is performed, and in the case where FALSE is received, a storage process is terminated.

After receiving the confirmation from the first user, operation S405 of hashing each of the first HTML file and the first image file, and generating a total hash value for the corresponding web page may be performed.

A hash value of the first HTML file and a hash value of the first image file may be generated by hashing the first HTML file and the first image file.

In an embodiment, the total hash value may be generated by using a tree together with the hash value of the first HTML file, the hash value of the first image file, a file storage path, the first timestamp, and the URL of the web page. For example, the tree may include a binary tree, a ternary tree, a Merkle tree, or the like. The following description refers to the Merkle tree. However, the disclosed web page storage system and method may also use other types of trees (e.g., a binary tree, a ternary tree, and the like).

In a further embodiment, to increase reliability of the total hash value, the total hash value may be generated by using the Merkle tree together with the hash value of the first HTML file, the hash value of the first image file, the file storage path, the first timestamp, the URL of the web, a count, and a verification status value. The count may indicate the number of verifications, and an initial value thereof is 0. The count may increase by 1 every subsequent verification. The verification status value may indicate whether or not verification is available. For example, the verification status value 1 may indicate that that the verification is available, and the verification status value 0 may indicate that the verification is unavailable. The initial value of the verification status value may be 1. The file storage path may be a storage path for the first HTML file and the first image file to be stored in an external file storage.

As described below, the total hash value generated in the above way may be used as a representative value indicating data regarding the web page and function as an ID for a transaction stored in a blockchain and/or files stored in the external file storage.

In a further embodiment, an operation of generating a status change hash value by adding a random number to the total hash value, salting the total hash value, and then hashing the total hash value may be further performed. The status change hash value may be used to change the verification status value when the verification of the web page is no longer needed. For example, when the verification of the web page is no longer needed, the verification status value 1 may be changed to 0. In contrast, the verification status value 0 may be changed to 1 to enable the verification of the web page. A detailed description of a method of changing the verification status value is given below with reference to FIGS. 12 and 13.

After operation S405, operation S406 of storing the first HTML file and the first image file in the external file storage by using the total hash value may be performed. For example, the first HTML file and the first image file may be stored by using the total hash value as a file name.

The first HTML file and the first image file may not be stored in the blockchain network. In other words, when storing an HTML file and an image file in a blockchain transaction, n times as much storage space as the number of n (4 in the present embodiment) peers needs to be used, and accordingly, an invoke/query speed of the transaction becomes slow. Therefore, the first HTML and first image files may be stored in the external file storage rather than in the blockchain network, and the file storage path may be stored in the blockchain network.

Next, operation S407 of storing, in the blockchain network, first transaction data including the hash value of the first HTML file, the hash value of the first image file, the file storage path, the first timestamp, the URL, and the total hash value may be performed. In a further embodiment, the first transaction data may further include at least one of the count, the verification status value, and the status change hash value. Table 1 below describes data that may be included in a transaction.

TABLE 1

| Data | Data Description |
| --- | --- |
| HashOfTotal | Total hash value generated by using HashOfImage, HashOfHtml, Timestamp, and the like |
| HashOfStatus | Status change hash value generated by salting random number to total hash value and then hashing total hash value |
| HashOfImage | Hash value of image file obtained by rendering web page |
| HashOfHtml | Hash value of stored HTML file |
| FilePath | Storage path for HTML file and image file of web page |
| Count | Number of verifications (initial value: 0) |
| Status | Verification status, 1: verification available, 0: verification unavailable (initial value: 1) |
| Timestamp | HTML download time and/or first image file generation time and/or time at which files are temporarily stored |
| URL | Address of stored web page |

Figure 6:
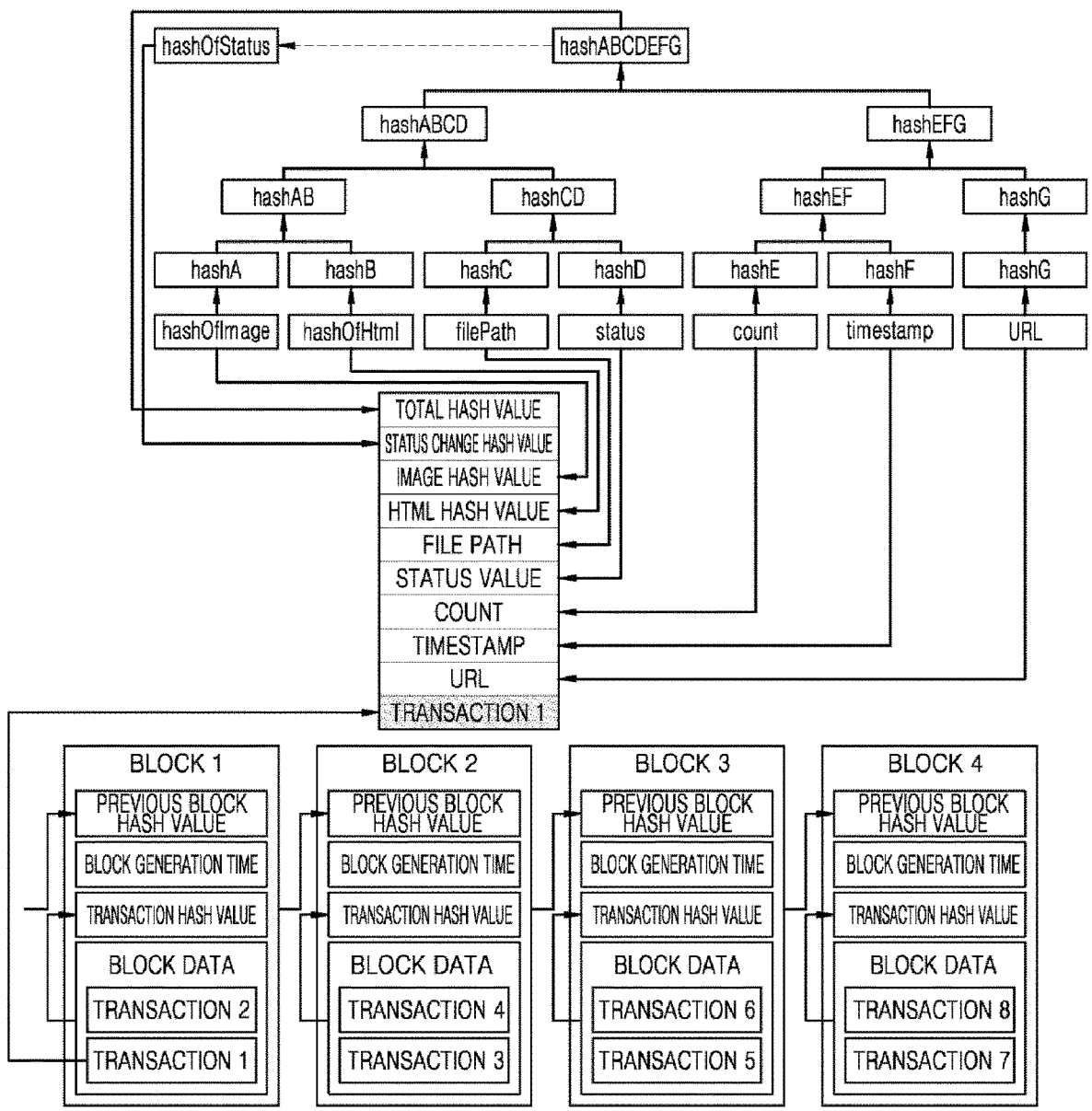
FIG. 6 schematically illustrates an example of a block diagram of a transaction stored in a blockchain.

Referring to FIG. 6, an example of a block diagram of a transaction stored in a blockchain is illustrated. FIG. 6 illustrates a transaction including pieces of data described in Table 1. In addition, FIG. 6 illustrates an example in which a hash value of an HTML file, a hash value of an image file, a file storage path, a timestamp, a URL, a total hash value, a count (the number of verifications), and a status change hash value goes through a Merkle tree and thus the total hash value is returned.

By storing transaction data described above in the blockchain, forgery or falsification of the hash value of the first HTML file, the hash value of the first image file, and the like may be prevented, and immutability of the transaction data may be guaranteed.

Referring again to FIG. 4, finally, operation S408 of transmitting the generated total hash value to the first user may be performed. For example, the management server 10 may display the total hash value to the first user through an application. In another example, when the first user inputs the email address and/or phone number in operation S401, the management server 10 may transmit the total hash value by email or text by using the input email address and/or phone number. In a further embodiment, in addition to the total hash value, the URL of the web page, the first timestamp, and/or the status change hash value may be transmitted to the first user. When wanting to compare web pages later, the first user may confirm a stored web page or perform web page comparison, by using the received total hash value (described below with reference to FIGS. 7 to 9). Also, when the verification of the web page is no longer needed, the first user may change the verification status value by using the received status change hash value (described below with reference to FIGS. 12 and 13). In a further embodiment, the email address and/or phone number input by the first user may be deleted immediately after transmitting the total hash value to the first user. As described above, the present system may also store and verify a web page without storing personal information.

FIG. 4 describes the method of receiving the URL from the first user and storing the web page corresponding to the URL. However, in a modified example, a particular keyword may be received from the first user, and one or more web pages including the particular keyword may be stored. For example, when the first user wants to store an Internet article including a particular keyword, the management server 10 may receive the particular keyword from the first user and store one or more Internet articles including the particular keyword. In a further embodiment, the management server 10 may store a web page including a particular keyword and then transmit information regarding the stored web page to the first user.

Figure 5:
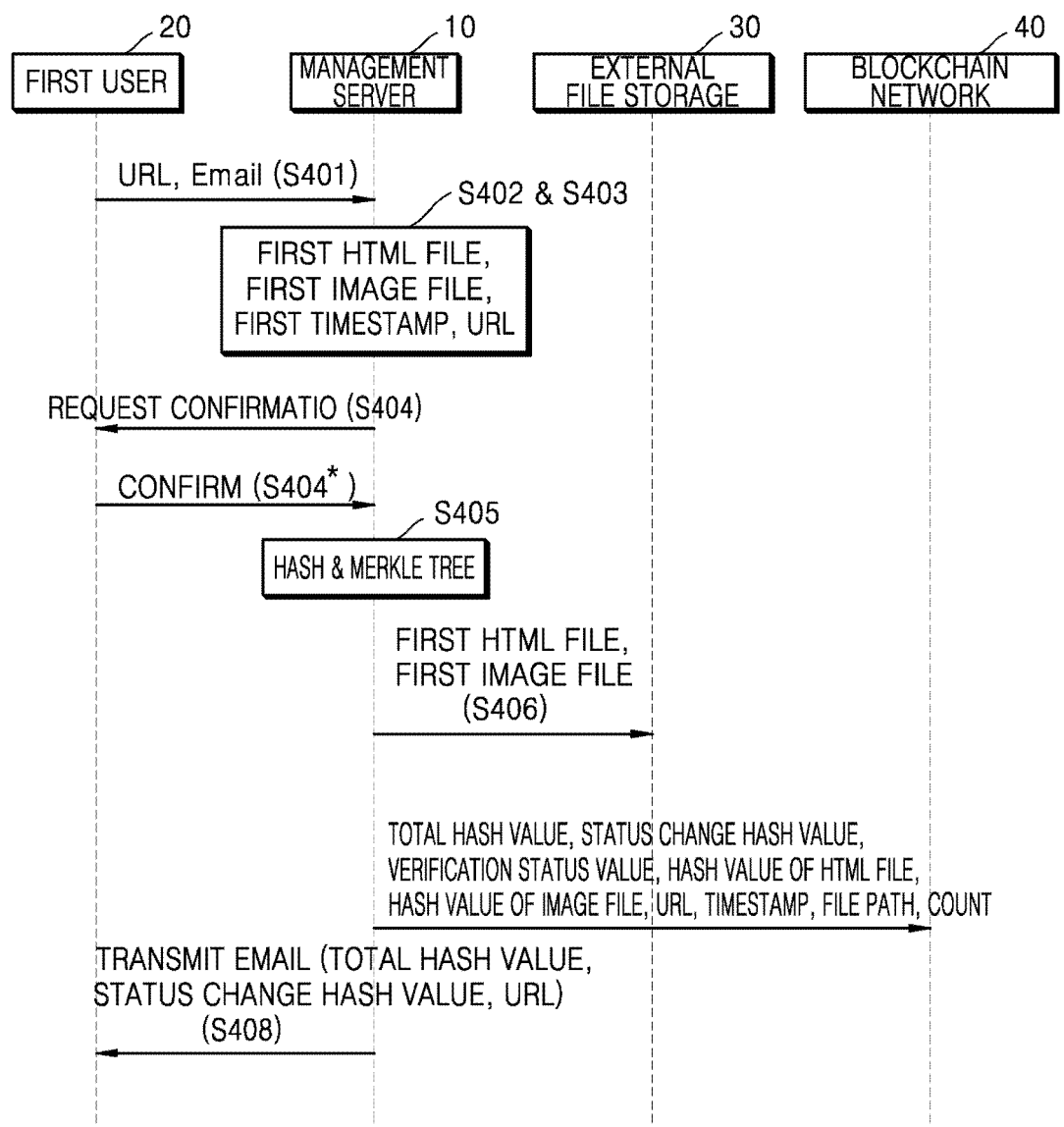
FIG. 5 schematically illustrates a process in which the web page storage method of FIG. 4 is performed in the system of FIG. 3.

FIG. 5 schematically illustrates a process in which the web page storage method of FIG. 4 is performed in the system of FIG. 3. The same descriptions between the following embodiments are omitted.

First, when wanting to store a particular web page, in operation S401, a first user 20 may transmit a URL of a web page to a management server 10. In an embodiment, a first user may additionally transmit an email address and/or phone number via which a storage result and/or a verification result of a web page are to be received. In an embodiment, the first user 20 may input the URL of the web page through an application provided by the management server 10.

In response to the reception of the URL from the first user 20, in operations S402 and 403, the management server 10 may download a first HTML file of the web page corresponding to the URL, generate a first image file by rendering the web page through a headless browser, and temporarily store the first HTML file and the first image file together with a first timestamp and, optionally, together with the corresponding URL.

Next, in operation S404, the management server 10 may output the first HTML file and the first image file of the URL transmitted by the first user 20, and request from the first user 20 confirmation of whether or not to store the present contents in a blockchain network 40 and/or an external file storage 30.

When the first user 20 answers the confirmation in operation S404*, in operation S405, the management server 10 may hash each of the first HTML file and the first image file, and generate a total hash value for the web page by using a Merkle tree. As described above, the management server 10 may generate the total hash value by using the Merkle tree together with a hash value of the first HTML file, a hash value of the first image file, a file storage path, the first timestamp, and the URL of the web page. In a further embodiment, the management server 10 may generate a status change hash value by adding a random number to the generated total hash value, salting the total hash value, and then hashing the total hash value.

Next, the management server 10 may store the first HTML file and the first image file in the external file storage 30 by using the total hash value. For example, the management server 10 may store, by using the total hash value as a file name, the files in an external file storage that matches a file storage path.

In operation S407, the management server 10 may store in the blockchain network 40 by storing the hash value of the first HTML file, the hash value of the first image file, the file storage path, the first timestamp, the URL, the total hash value, and the like in a transaction.

Finally, in operation S408, the management server 10 may notify the first user 20 that the storage of the web page is completed, by transmitting the total hash value and, optionally, the status change hash value, the URL, the timestamp, and the like. For example, the management server 10 may notify the completion of the storage through the email address and/or phone number input by the first user 20, or may notify the completion of the storage through an application provided by the management server 10.

Figure 7:
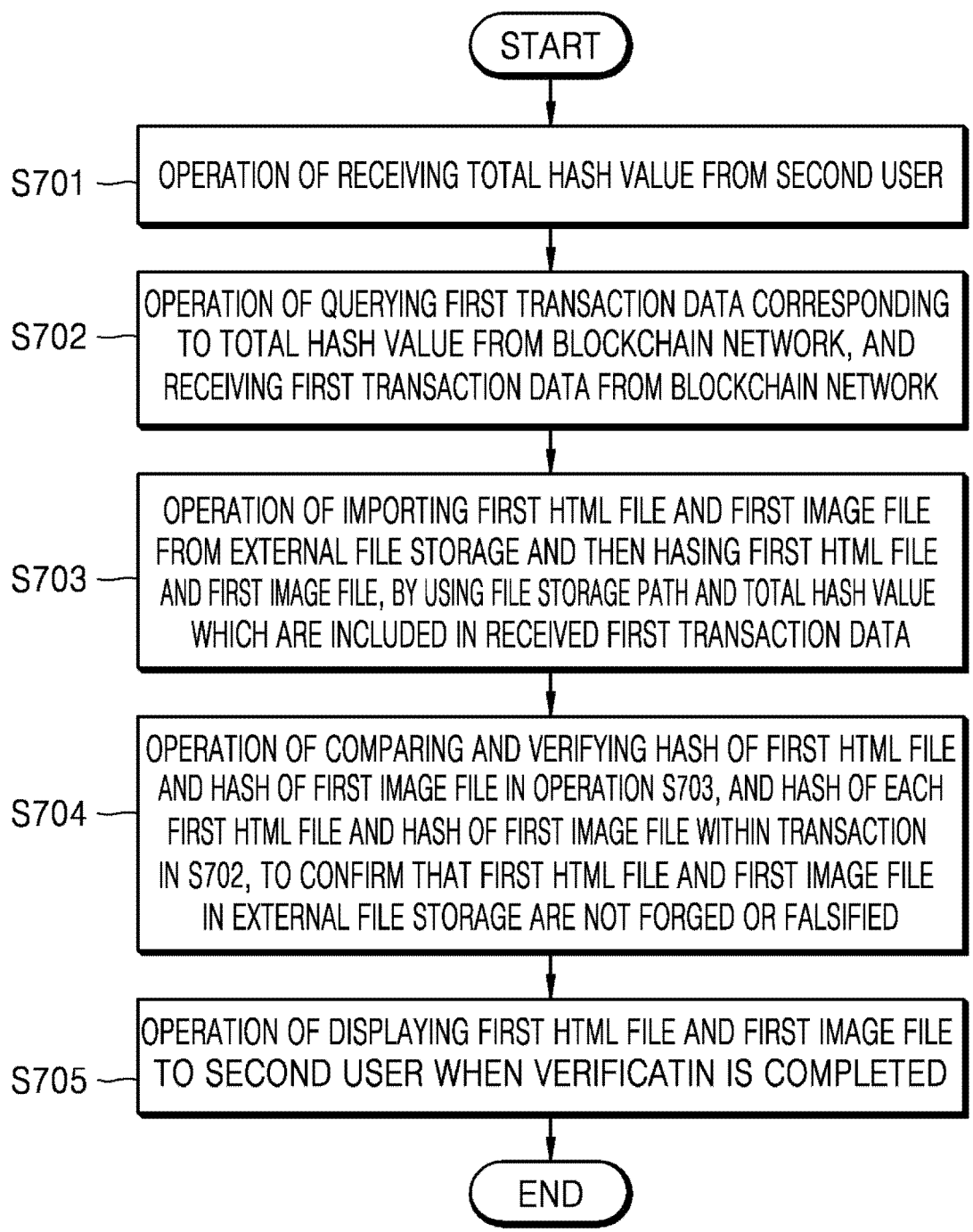
FIG. 7 is a flowchart of a method of confirming a stored web page, according to embodiments of the present disclosure.

FIG. 7 is a flowchart of a method of confirming a stored web page, according to embodiments of the present disclosure.

In detail, FIG. 7 describes a method for a second user to confirm a stored web page, according to the embodiments, described with reference to FIG. 4. The first user in FIG. 4 and the second user in FIG. 7 may be the same or different users. Also, the first user in FIG. 4 and the second user in FIG. 7 may be a person who provides a service through the web page or a person who uses a service within the web page, or may be a third party.

The method of confirming the stored web page of FIG. 7 may be performed by the management server 10 of FIG. 3.

First, operation S701 of receiving a total hash value from the second user at a second time after a first time, i.e., after storing a web page, may be performed. In an embodiment, the second user may also transmit a URL of the web page and/or a storage time of the web page, in addition to the total hash value. However, the total hash value is generated by using the URL of the web page and a timestamp, i.e., the total hash value also includes information regarding the URL and the timestamp, and thus, only receiving the total hash value from the second user may be sufficient. In a further embodiment, the second user may additionally transmit an email address and/or phone number via which stored files may be received.

After receiving the total hash value from the second user, operation S702 of querying first transaction data corresponding to the total hash value from a blockchain network and receiving the first transaction data from the blockchain network may be performed. In detail, the management server 10 may query the first transaction data corresponding to the total hash value by transmitting the total hash value to the blockchain network and import the first transaction data.

Next, in operation S703, a first HTML file and a first image file may be imported from an external file storage by using a file storage path and the total hash value, which are included in the received first transaction data, and then hashed. In operation S704, to confirm that the first HTML file and the first image file in the external file storage are not forged or falsified, the hash of the first HTML file and the hash of the first image file in operation S703 may be compared and verified with a hash of each first HTML file and a hash of a first image file within the transaction (the first transaction data?) in operation S702. In operation S705, when the verification is completed, the first HTML file and the first image file may be output (e.g., displayed) to the second user. For example, the management server 10 may search for and import files, which use the total hash value as a file name, from the external file storage corresponding to the file storage path within the first transaction data received from the blockchain network, allow the files to undergo the verification procedure described above, and then output the files to the second user. In a further embodiment, the management server 10 may transmit the stored first HTML file and first image file by using an email address and/or phone number transmitted by the second user. In another embodiment, the management server 10 may display the first HTML file and the first image file to the second user through an application.

As described above, according to embodiments of the present disclosure, when knowing only the total hash value, the second user may confirm the contents of the stored web page at any time (e.g., when wanting to confirm the contents of a transaction after the transaction on a web).

When knowing only the total hash value, the second user may confirm the contents of the stored web page without membership registration, login, or other authentication procedures, and accordingly, a risk of personal information leakage may be fundamentally eliminated.

Figure 8:
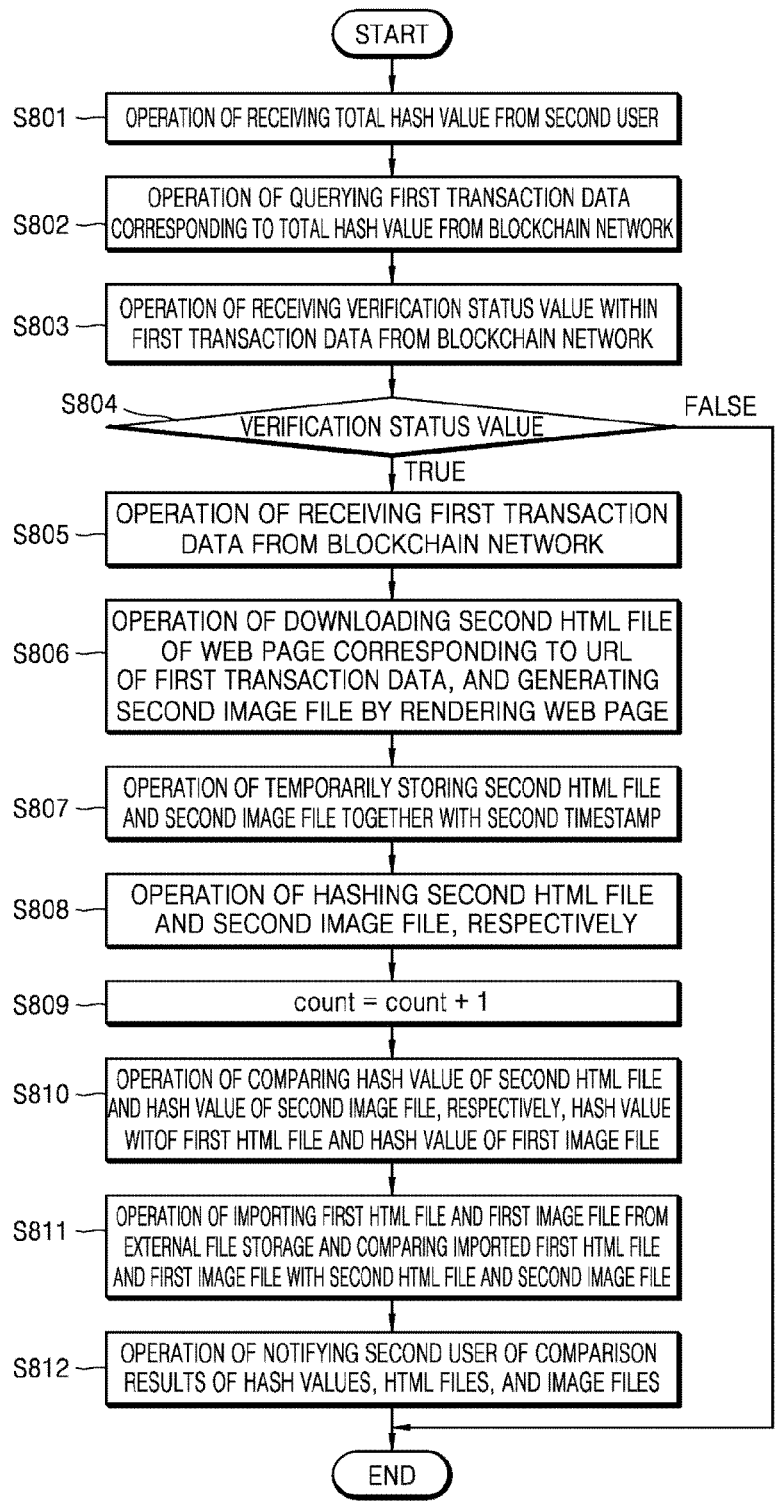
FIG. 8 is a flowchart of a method of comparing and verifying a stored web page and a current web page, according to embodiments of the present disclosure.

FIG. 8 is a flowchart of a method of comparing and verifying a stored web page and a current web page, according to embodiments of the present disclosure. In detail, FIG. 8 illustrates a method of comparing a current web page with a web page stored according to the embodiments described with reference to FIG. 4.

For example, when a second user wants to confirm whether or not the contents of a web page are changed after the web page is stored at a first time at a request of a first user, i.e., when wanting to compare a current web page with a previously stored web page, the method of FIG. 8 may be performed. The first user in FIG. 4 and the second user in FIG. 8 may be the same or different users. Also, the first user in FIG. 4 and the second user in FIG. 8 may be a person who provides a service through the web page or a person who uses a service within the web page, or may be a third party.

The web page comparison and verification method of FIG. 8 may be performed by the management server 10 of FIG. 3. The same descriptions between the following embodiments are omitted.

First, operation S801 of receiving a total hash value from the second user at a second time after a first time, i.e., after storing the web page, may be performed. In an embodiment, the second user may transmit a URL of the web page and/or a storage time of the web page, in addition to the total hash value. However, the total hash value also includes information regarding the URL and a timestamp, and thus, only receiving the total hash value from the second user is sufficient. In a further embodiment, the second user may additionally send an email address and/or phone number via which a comparison result may be received.

After receiving the total hash value from the second user, operation S802 of querying first transaction data corresponding to the total hash value from a blockchain network may be performed. In detail, the management server 10 may query the first transaction data corresponding to the total hash value by transmitting the total hash value to the blockchain network.

Next, in an embodiment, operation S803 of receiving a verification status value within the first transaction data from the blockchain network may be performed.

As described above, the verification status value may indicate whether verification is available. For example, the verification status value 1 (i.e., TRUE) may indicate that the verification is available, and the verification status value 0 (i.e., FALSE) may indicate that the verification is unavailable. An initial value of the verification status value may be 1. Accordingly, operation S804 of confirming the verification status value may be performed, in the case where the verification status value is TRUE, web page comparison and verification methods may be continuously performed, in the case where the verification status value is FALSE, the verification may be unavailable, and thus, the present method may be terminated. However, for simplicity of a procedure, operations S803 and S804 of receiving and confirming the verification status value may be omitted.

In the case where the verification status value is TRUE as a result of operation S804, operation S805 of receiving the first transaction data from the blockchain network may be performed. In other words, a hash value of a first HTML file, a hash value of a first image file, a first timestamp, a file storage path, a URL, and the like may be received from the blockchain network. In the case where the verification status value is FALSE, the first transaction data may not be received from the blockchain network.

Next, operation S806 of downloading a second HTML file of the web page corresponding to the URL within the received first transaction data and generating a second image file by rendering the web page through a headless browser may be performed.

Next, operation S807 of temporarily storing the second HTML file and the second image file together with a second timestamp may be performed. The second timestamp may indicate a time at which the second HTML file of the web page is downloaded and/or a time at which the second image file is generated by rendering the web page and/or a time at which the second HTML file and the second image file are temporarily stored. In an embodiment, the management server 10 may also temporarily store the URL of the web page in addition to the second HTML file, the second image file, and the second timestamp.

Next, operation S808 of hashing each of the second HTML file and the second image file, may be performed. A hash value of the second HTML file and a hash value of the second image file may be generated by hashing the second HTML file and the second image file.

In a further embodiment, a second total hash value may be generated by using a Merkle tree together with the hash value of the second HTML file, the hash value of the second image file, the file storage path, the second timestamp, and the URL of the web page. In a further embodiment, to increase reliability of the second total hash value, the second total hash value may be generated by using the Merkle tree together with the hash value of the second HTML file, the hash value of the second image file, the file storage path, the second timestamp, the URL of the web page, a count, and a verification status value. In a further embodiment, to additionally store a web page when the second user requests comparison and verification of the web page, an operation of storing, in the blockchain network, second transaction data including the second total hash value, the hash value of the second HTML file, the hash value of the second image file, the file storage path, the second timestamp, and the URL of the web page may be performed. When the web page when the second user requests the comparison and verification of the web page does not need to be stored, the present operation may be omitted.

In a further embodiment, an operation of storing the second HTML file and the second image file in an external file storage by using the second total hash value may be performed. For example, the second HTML file and the second image file may be stored by using the second total hash value as a file name.

Next, operation S809 of updating a corresponding transaction by increasing, by 1, the count indicating the number of verifications may be performed. FIG. 8 illustrates that operation S809 of increasing the count is performed before operation S810 of comparing hash values. However, in other embodiments, operation S809 of increasing the count may be performed after operation S810 of comparing hash values, or may be performed immediately after receiving the first transaction data from the blockchain network. In other embodiments, for simplicity of the procedure, operation S809 of increasing the count may be omitted.

Next, operation S180 of comparing the hash value of the second HTML file and the hash value of the second image file, respectively, with the hash value of the first HTML file and the hash value of the first image file within the received first transaction data may be performed. When the first HTML file at the first time and the second HTML file at the second time are the same as each other, i.e., when an HTML of the web page is not changed between the first time and the second time, the hash value of the first HTML file and the hash value of the second HTML file may be the same as each other. However, when the first HTML file at the first time and the second HTML file at the second time are different from each other, i.e., when the HTML of the web page is changed between the first time and the second time, the hash value of the first HTML file and the hash value of the second HTML file may be different from each other. Similarly, when the first image file at the first time and the second image file at the second time are the same as each other, i.e., when an image of the web page is not changed between the first time and the second time, the hash value of the first image file and the hash value of the second image file may be the same as each other. However, when the first image file at the first time and the second image file at the second time are different from each other, i.e., when the image of the web page is changed between the first time and the second time, the hash value of the first image file and the hash value of the second image file may be different from each other. In an embodiment, after comparing the hash values, an operation of generating a comparison result may be performed. For example, when hash values of HTML files and hash values of image files are all the same as one another, <TRUE, TRUE>, which is a result value set, may be generated, and when the hash values of the HTML files are the same as each other but the hash values of the image files are different from each other, <TRUE, FALSE>, which is a result value set, may be generated.

Accordingly, whether or not a web page is changed may be confirmed only by comparing hash values. In addition, the hash values are stored in a blockchain network rather than in the external file storage, and thus, integrity thereof may be proven, and accordingly, a comparison result of the hash values is also reliable.

In a further embodiment, an operation of comparing a total hash value of the web page at the first time and a second total hash value of the web page at the second time may be further performed. However, a timestamp is used when generating a total hash value, and thus, a total hash value at a first time and a second total hash value at a second time may be always different from each other, regardless of whether or not the contents of a web page content are changed.

Then, in a further embodiment, an operation S811a (shown in FIG. 9) of importing the first HTML file and the first image file from the external file storage by using the file storage path and the total hash value, which are included in the first transaction data received from the blockchain network, may be performed. For example, the management server 10 may search for and import files, which use the total hash value as a file name, from the external file storage corresponding to the file storage path within the first transaction data received from the blockchain network. Next, operation S811b (shown in FIG. 9) of comparing the first HTML file and the first image file imported from the external file storage with the temporarily stored second HTML file and second image file may be performed. In an embodiment, the comparison between the first image file and the second image file may be performed through a deep learning model such as a CNN that is a field of artificial intelligence. In a further embodiment, after comparing HTML files and image files, an operation of generating a comparison result may be performed.

Although whether or not the web page is changed may be confirmed just by comparing the hash values in operation S810, confirming exactly which portion of HTML and image files is changed is not easy. However, which portion of the web page is changed may be easily confirmed by directly comparing HTML files and image files through operation S811. However, although the HTML file and the image file are stored in the external file storage rather than in the blockchain network, the comparison result through operation S811 may be used as data that undergoes a verification process, rather than simple reference data.

Finally, operation S812 of outputting (e.g., displaying) comparison results between the hash values, the HTML files, and the image files to a second user may be performed. For example, the management server 10 may display the comparison results to the second user through an application. In another example, when the second user inputs an email address and/or phone number in operation S801, the management server 10 may transmit the comparison results by email or text by using the input email address and/or phone number.

Figure 9:
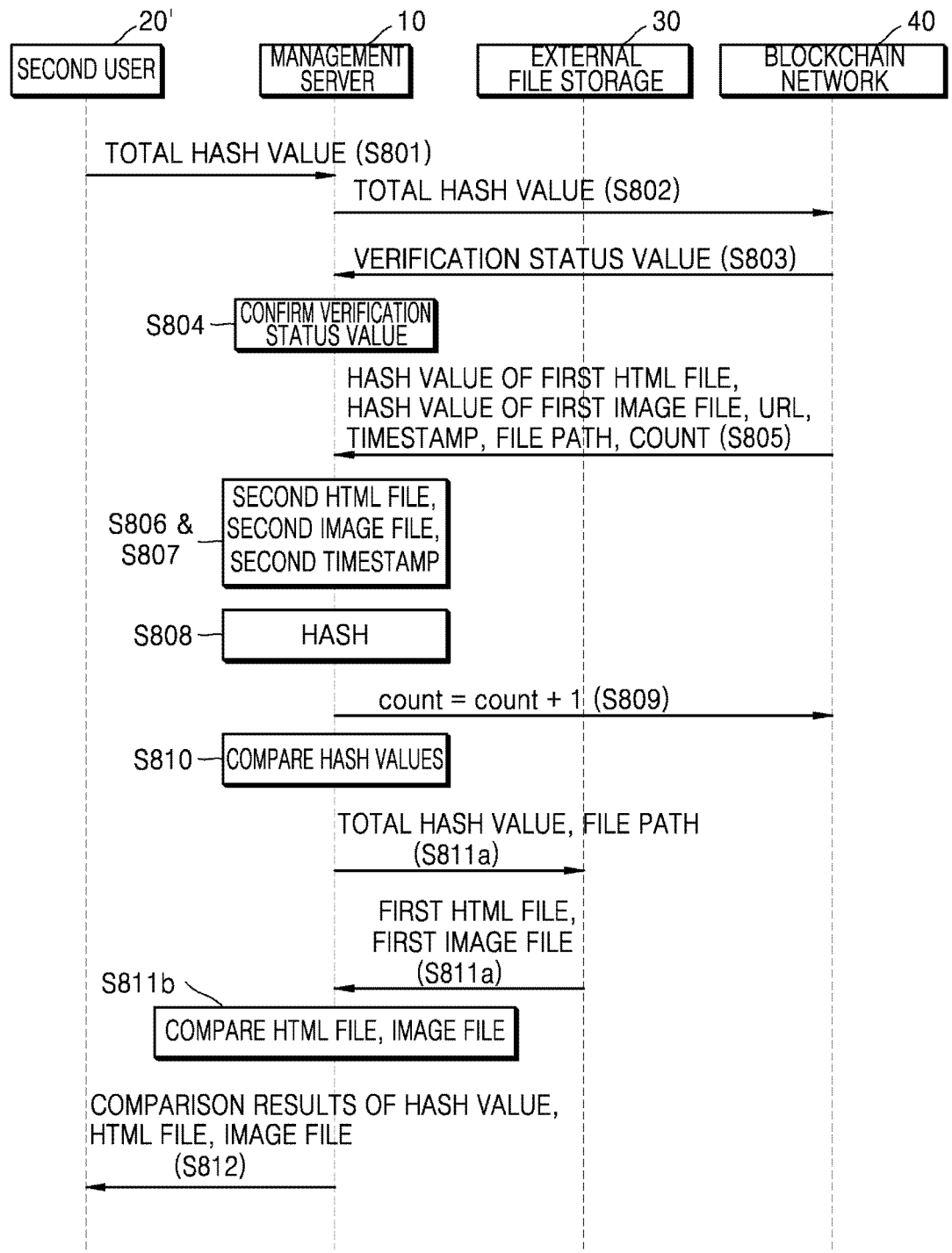
FIG. 9 schematically illustrates a process in which the web page comparison and verification method of FIG. 8 is performed in the system of FIG. 3.

FIG. 9 schematically illustrates a process in which the web page comparison and verification method of FIG. 8 is performed in the system of FIG. 3. The same descriptions between the following embodiments are omitted.

First, in operation S801, at a second time after a first time, when comparison and verification of a web page are needed, a second user 20' may transmit a total hash value to a management server 10. In an embodiment, the second user 20' may additionally transmit a URL of the web page, a storage time of the web page, an email address and/or phone number via which a comparison result may be received, and the like, in addition to the total hash value. In an embodiment, the second user 20' may also input the total hash value through an application provided by the management server 10.

After receiving the total hash value from the second user 20', in operation S802, the management server 10 may query first transaction data corresponding to the total hash value from a blockchain network 40. In detail, the management server 10 may query the first transaction data corresponding to the total hash value by transmitting the total hash value to the blockchain network 40.

Next, in an embodiment, in operation S803, the blockchain network 40 may return a verification status value within the first transaction data to the management server 10.

In operation S804, the management server 10 may confirm the verification status value received from the blockchain network 40. In the case where the verification status value is TRUE, web page comparison and verification processes may be continuously performed, and in the case where the verification status value is FALSE, verification may be determined to be unavailable and the processes may be terminated.

In the case where the verification status value is TRUE as a result of operation S804, in operation S805, the management server 10 may request the first transaction data from the blockchain network 40 and receive the same. In other words, the management server 10 may receive a hash value of a first HTML file, a hash value of a first image file, a first timestamp, a file storage path, a URL, and the like, which are included in the first transaction data. In the case where the verification status value is FALSE, the first transaction data may not be requested from the blockchain network 40.

Next, in operation S806 and 807, the management server 10 may download a second HTML file of the web page corresponding to the URL within the first transaction data received from the blockchain network 40, generate a second image file by rendering the web page through a headless browser, and temporarily store the files together with a second timestamp. In an embodiment, the management server 10 may also temporarily store the URL of the web page in addition to the second HTML file, the second image file, and the second timestamp.

Next, in operation S808, the management server 10 may hash each of the second HTML file and the second image file. The management server 10 may generate a hash value of the second HTML file and a hash value of the second image file by hashing the second HTML file and the second image file. In a further embodiment, the management server 10 may also generate a second total hash value by using a Merkle tree together with the hash value of the second HTML file, the hash value of the second image file, a file storage path, the second timestamp, and the URL of the web page. In a further embodiment, the management server 10 may store, in the blockchain network 40, second transaction data including the second total hash value, the hash value of the second HTML file, the hash value of the second image file, the file storage path, the second timestamp, and the URL of the web page. In a further embodiment, the management server 10 may store the second HTML file and the second image file in an external file storage 30 by using the second total hash value and/or the file storage path.

Next, in operation S809, the management server 10 may update a corresponding transaction within the blockchain network 40 by increasing, by 1, a count indicating the number of verifications.

Then, in operation S810, the management server 10 may compare the hash value of the second HTML file and the hash value of the second image file, respectively, with the hash value of the first HTML file and the hash value of the first image file within the first transaction data received from the blockchain network 40. In an embodiment, the management server 10 may generate a comparison result after comparing hash values. For example, the management server 10 may generate a result value set <TRUE, TRUE>, <TRUE, FALSE>, <FALSE, TRUE>, or <FALSE, FALSE>, according to the comparison result of the hash values.

Then, in a further embodiment, in operation S811a, the management server 10 may import the first HTML file and the first image file from the external file storage 30 by using the file storage path and the total hash value which are included in the first transaction data received from the blockchain network 40. Next, in operation S811b, the management server 10 may compare the first HTML file and the first image file imported from the external file storage 30 with the temporarily stored second HTML file and second image file. In a further embodiment, the management server 10 may compare HTML files and image files and then generate a comparison result.

Finally, in operation S812, the management server 10 may output (e.g., display) the comparison results between the hash values, the HTML files, and the image files to the second user 20'.

Figure 10:
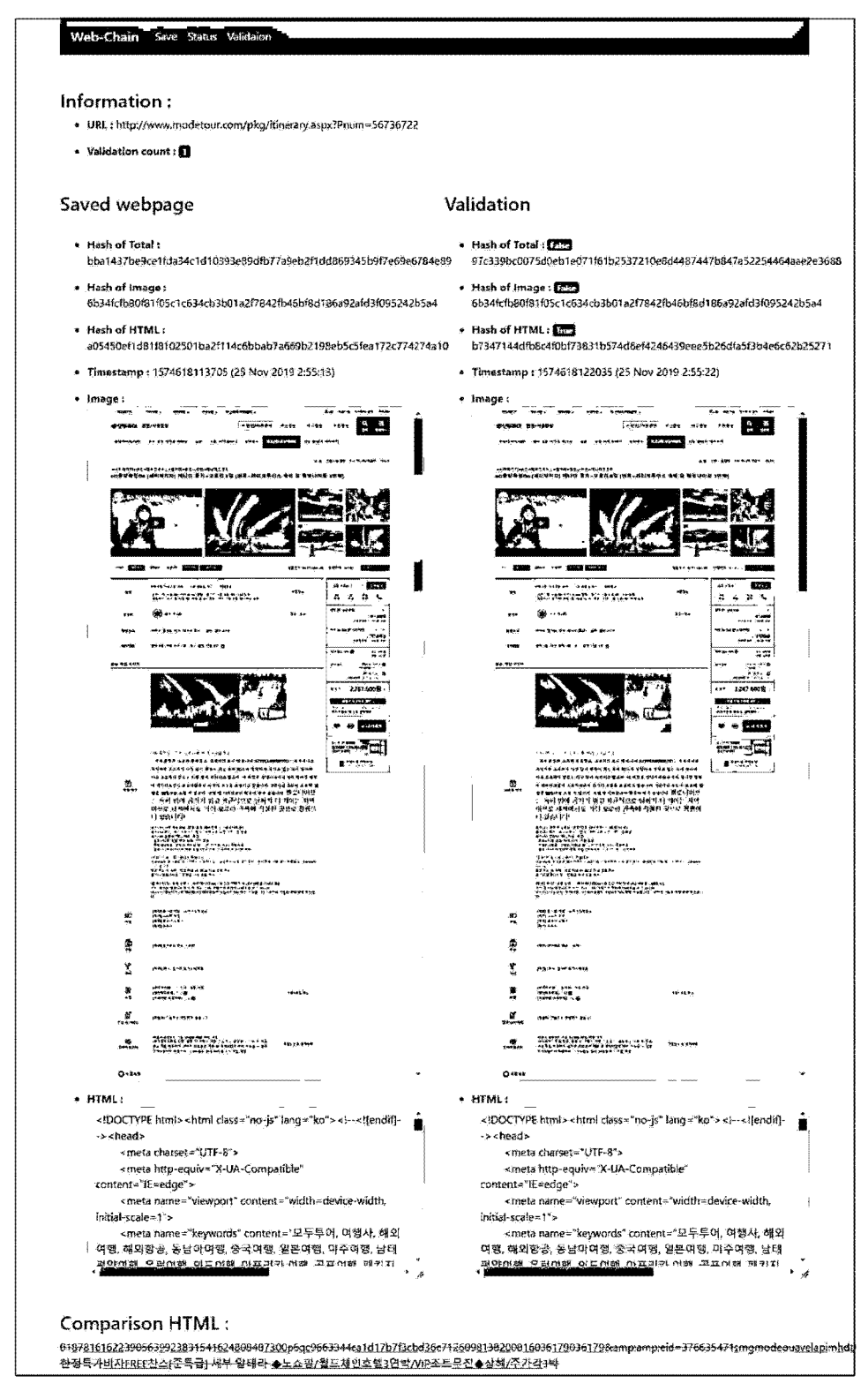

FIG. 10 illustrates an example of a web page comparison and verification result displayed to a second user by using the methods of FIGS. 8 and 9.

The left side of FIG. 10 illustrates data regarding a web page stored at a first time, and the right side illustrates a comparison result between data regarding the web page stored at a second time and the data stored at the first time.

As illustrated in FIG. 10, the management server 10 may display a comparison result (TRUE or FALSE) between hash values together while displaying a hash value of a first image file, a hash value of a first HTML file, a hash value of a second image file, and a hash value of a second HTML file to the second user 20'. Also, the management server 10 may additionally display a total hash value and timestamp of the web page at the first time and a second total hash value and timestamp of the web page at the second time.

In addition, the comparison result may be output by highlighting modified portions of files while displaying image files and HTML files, so that the second user 20' may easily confirm which portion of the web page is changed.

Referring to FIG. 10, the management server 10 may derive a difference (e.g., text or an image) between a first image and a second image by analyzing the first image and the second image by using deep learning, and mark a corresponding portion with a red border to enable a verifier and/or a user to confirm the corresponding portion quickly and clearly.

In a further embodiment, the management server 10 may display a URL of the web page and/or a validation count indicating the number of validations, together with the comparison result.

Figure 11:
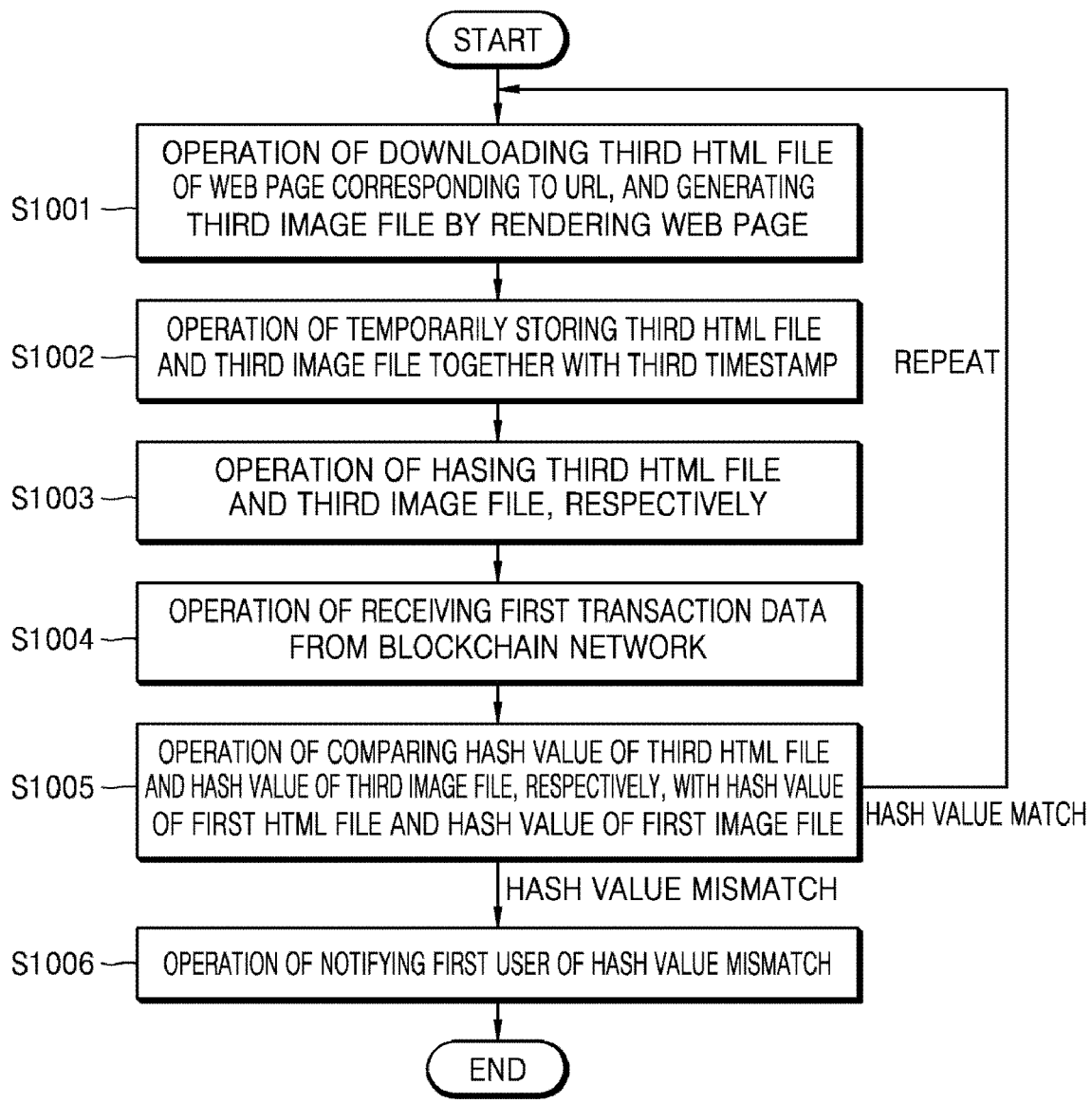
FIG. 11 is a flowchart of a method of comparing and verifying a web page, according to other embodiments of the present disclosure.

FIG. 11 is a flowchart of a method of comparing and verifying a web page, according to other embodiments of the present disclosure. In detail, FIG. 11 illustrates a method capable of periodically comparing a web page and notifying a user of a change when a change in the web page is detected.

The web page comparison and verification method of FIG. 11 may be performed by the management server 10 of FIG. 3. The same descriptions between the following embodiments are omitted.

First, after a first time, i.e., after receiving a URL from a first user and storing a web page, operation S1001 of downloading a third HTML file of the web page corresponding to the URL, and generating a third image file by rendering the web page through a headless browser may be performed.

Next, in operation S1002, the third HTML file and the third image file may be temporarily stored together with a third timestamp.

Next, operation S1003 of hashing each of the third HTML file and the third image file, may be performed. A hash value of the third HTML file and a hash value of the third image file may be generated by hashing the third HTML file and the third image file.

In a further embodiment, a third total hash value may also be generated by using a Merkle tree together with the hash value of the third HTML file, the hash value of the third image file, a file storage path, a third timestamp, and the URL of the web page. In a further embodiment, an operation of storing, in a blockchain network, third transaction data including the third total hash value, the hash value of the third HTML file, the hash value of the third image file, the file storage path, the third timestamp, and the URL of the web page may be performed. The generation and storage of the third total hash value may be for tracking a web page change as needed and may be omitted.

In a further embodiment, an operation of storing the third HTML file and the third image file in an external file storage by using the third total hash value may be performed. The third HTML file and the third image file may be for tracking the web page change as needed and may be omitted. However, when an HTML file and an image file are periodically generated and stored, a large amount of capacity is needed, and thus, when the hash values match in operation S1005, the hash values may not be stored.

Next, operation S1004 of querying first transaction data corresponding to a total hash value from the blockchain network and receiving the first transaction data from the blockchain network may be performed.

Then, operation S1005 of comparing the hash value of the third HTML file and the hash value of the third image file, respectively, with a hash value of a first HTML file and a hash value of a first image file within the first transaction data received from the blockchain network may be performed. When an HTML of the web page is not changed after the first time, the hash value of the first HTML file and the hash value of the third HTML file may be the same as each other. However, when the HTML of the web page is changed after the first time, the hash value of the first HTML file and the hash value of the third HTML file may be different from each other. Similarly, when an image of the web page is not changed after the first time, the hash value of the first image file and the hash value of the third image file may be the same as each other. However, when the image of the web page is changed after the first time, the hash value of the first image file and the hash value of the third image file may be different from each other.

When the hash value of the first HTML file and the hash value of the third HTML file are not the same as each other or the hash value of the first image file and the hash value of the third image file are not the same as each other, i.e., when the contents of the web page are changed after the first time, operation S1006 of notifying the first user of a hash value mismatch may be performed.

In a further embodiment, when the hash value of the first HTML file and the hash value of the third HTML file are not the same as each other or the hash value of the first image file and the hash value of the third image file are not the same as each other, an operation of importing the first HTML file and the first image file from the external file storage, comparing the imported first HTML file and first image file with the temporarily stored third HTML file and third image file, and displaying a result of the comparison to the first user may be further performed.

However, when hash values of image files match each other and hash values of HTML files match each other, i.e., when the contents of the web page are not changed after the first time, the process may return to operation S1001 without notifying the first user. In another embodiment, when the hash values of the image files match each other and the hash values of the HTML files match each other, the first user may be notified that the hash values match each other.

Operations S1001 to S1005 may be performed periodically (e.g., one day, one week, one month, or the like). In an embodiment, operations S1001 to S1005 may be periodically performed until the hash value of the first HTML file and the hash value of the third HTML file are not the same as each other, or the hash value of the first image file and the hash value of the third image file are not the same as each other. The repetition period of operations S1001 to S1005 may be determined in advance by the first user or a management server. When the web page verification method is periodically performed, the user may be able to know of a change when a web page confirmed by a service user at the time of contract is changed.

Figure 12:
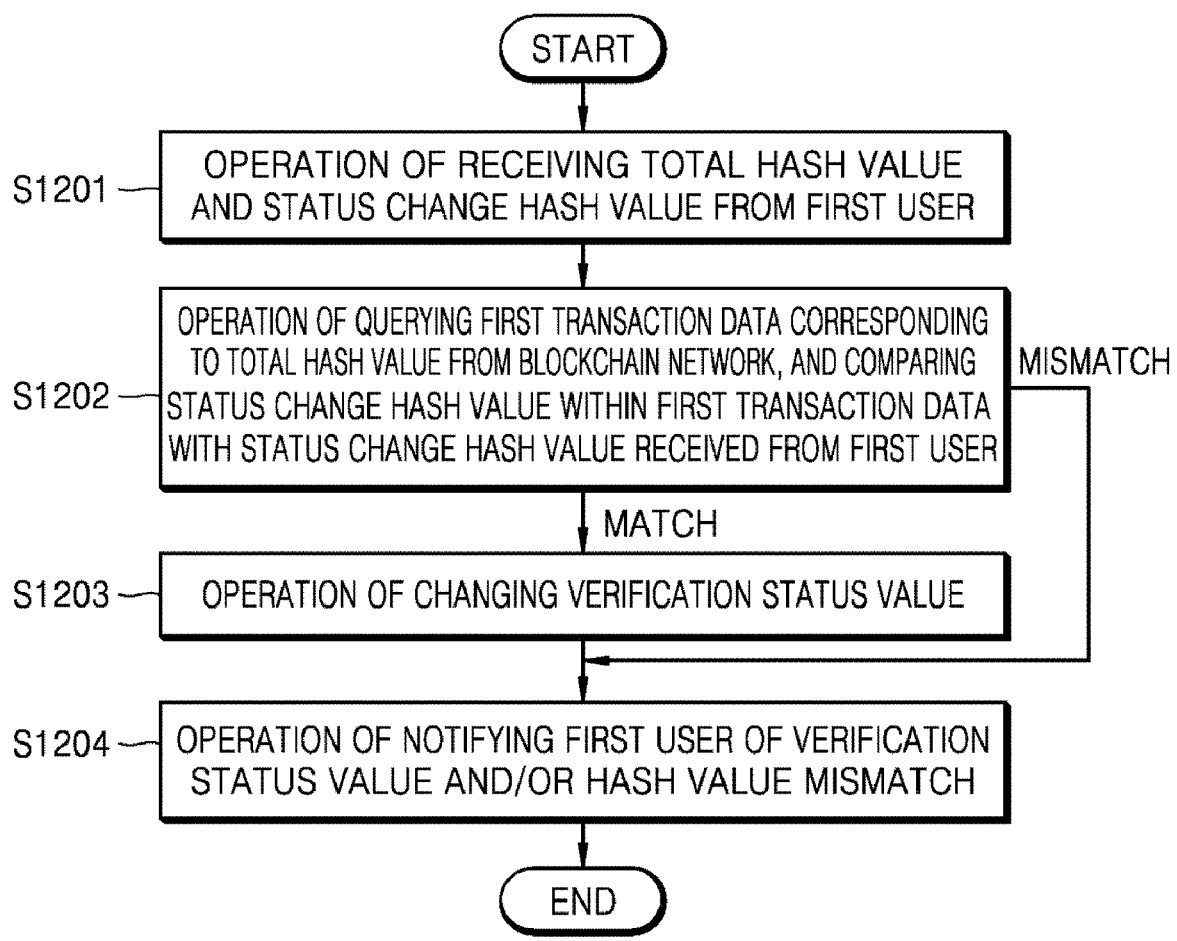
FIG. 12 is a flowchart of a method of changing a verification status value by using a status change hash value, according to embodiments of the present disclosure.

FIG. 12 is a flowchart of a method of changing a verification status value by using a status change hash value, according to embodiments of the present disclosure. The same descriptions between the following embodiments are omitted.

As described above in relation to operation S405 of FIG. 4, an operation of generating a status change hash value by adding a random number to a total hash value, salting the total hash value, and then hashing the total hash value may be further performed. A verification status value included within a first transaction may indicate whether or not verification is available. For example, the verification status value 1 may indicate that the verification is available, and the verification status value 0 may indicate that the verification is unavailable. An initial value of the verification status value may be 1. The status change hash value may be used to change the verification status value. For example, when verification of a web page is no longer needed, the verification status value 1 may be changed to 0. In contrast, the verification status value 0 may be changed to 1 to enable the verification of the web page. In operation S408 of FIGS. 4 and 5, the management server 10 may transmit the status change hash value to the first user together with a total hash value, so that the first user may change the verification status value when the verification of the web page is no longer needed.

Hereinafter, the description of the verification status value change method of FIG. 12 is on the basis that a first user receives a total hash value and a status change hash value from a management server.

First, operation S1201 of receiving a total hash value and a status change hash value from a first user may be performed.

Next, operation S1202 of querying first transaction data corresponding to the total hash value from a blockchain network and comparing a status change hash value within the first transaction data with the status change hash value received from the first user may be performed.

When the status change hash value within the first transaction data does not match the status change hash value received from the first user, operation S1204 of notifying the first user of a status change hash value mismatch together with a current verification status value may be performed.

When the status change hash value within the first transaction data matches the status change hash value received from the first user, operation S1203 of changing the verification status value may be performed. For example, in the case where the verification status value is 1, the verification status value may be changed to 0. In contrast, in the case where the verification status value is 0, the verification status value may be changed to 1.

Next, operation S1204 of notifying the first user of the change in the verification status value together with the changed verification status value may be performed.

Figure 13:
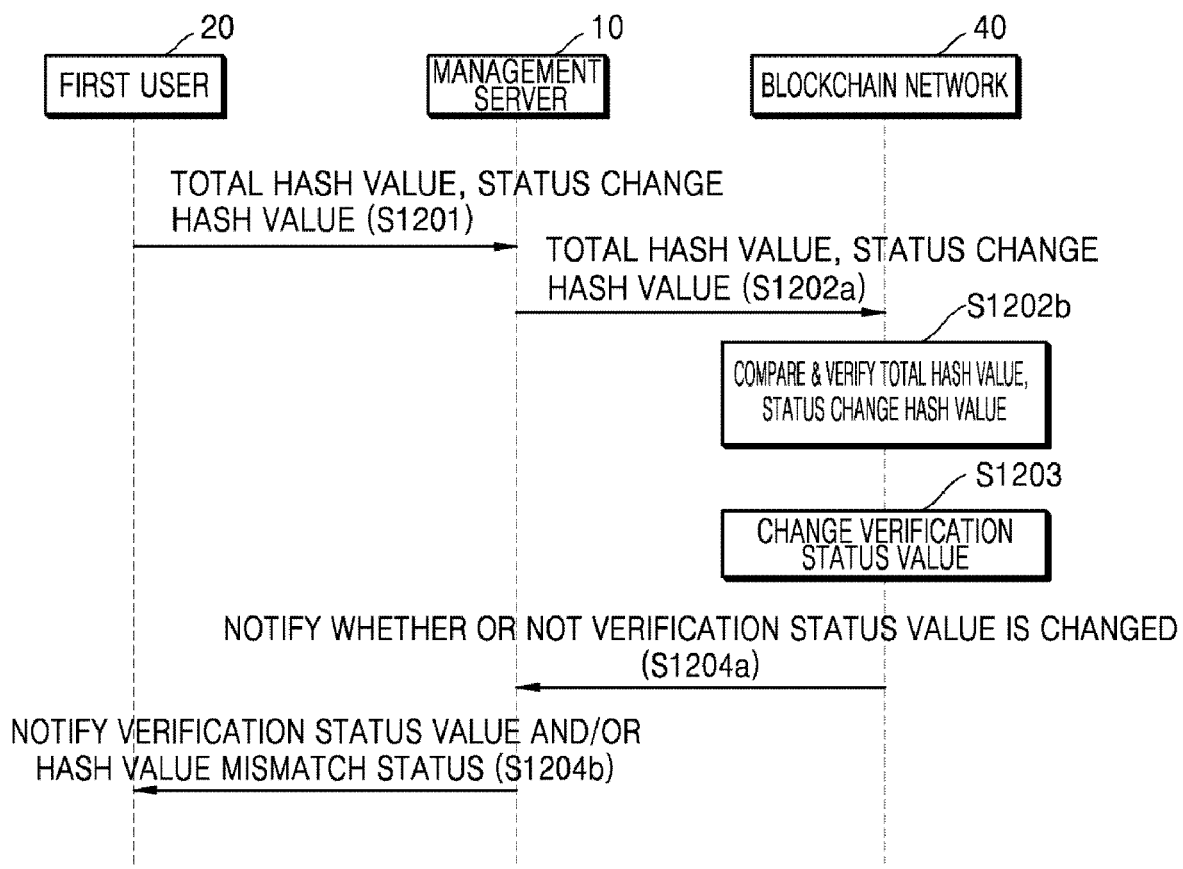
FIG. 13 schematically illustrates a process in which the verification status value change method of FIG. 12 is performed in the system of FIG. 3.

FIG. 13 schematically illustrates a process in which the verification status change method of FIG. 12 is performed in the system of FIG. 3. The same descriptions between the following embodiments are omitted.

First, in operation S1201, a first user 20 may transmit a total hash value and a status change hash value to a management server 10. For example, the first user 20 may transmit the total hash value and the status change hash value when needing verification of a web page no longer or when desiring to enable the verification of the web page.

In response to receiving the total hash value and the status change hash value from the first user 20, in operation S1202a, the management server 10 may transmit the total hash value and the status change hash value to a blockchain network 40.

In operation S1202b, the blockchain network 40 may query first transaction data corresponding to the total hash value received from the management server 10, and compare a status change hash value within the first transaction data with the status change hash value received from the management server 10.

When the status change hash value within the first transaction data does not match the status change hash value received from the management server 10, in operation S1204a, the blockchain network 40 may notify the management server 10 of a status change hash value mismatch together with a current verification status value, and in operation S1204b, the management server 10 may notify the first user 20 of a verification status value change result and/or the hash value mismatch.

When the status change hash value within the first transaction data matches the status change hash value received from the management server 10, in operation S1203, the blockchain network 40 may change the verification status value.

Next, in operation S1204a, the blockchain network 40 may notify the management server 10 of the change in the verification status value together with the changed verification status value, and in operation S1204b, the management server 10 may notify the first user 20 of the verification status value change result.

According to a method of storing, comparing, and verifying a web page according to embodiments of the present disclosure, an image obtained by rendering the web page and an original HTML file are stored in an external file storage, and hash values of the respective files and a file path are stored in a transaction and stored in a blockchain. As described above, from among transaction data stored in the blockchain, only a verification status value and a count (i.e., the number of verifications) may be updated. Hash values, a timestamp, a storage path, and the like within the stored transaction data may not be changed and/or updated, and thus, forgery or falsification of the transaction data is fundamentally blocked. To modify the transaction data other than the verification status value and the count, access authority of a node to a blockchain network is needed and a certificate of a blockchain system needs to be acquired, and thus, the transaction data may not be randomly changed and/or updated.

According to embodiments of the present disclosure, a system, which may be trusted by transaction parties, may be established at the time of a transaction on a web. The system may store the web page in the system and then transmit a URL, a total hash value, an image file, an HTML file, and the like to a service user, a service user, and a third party. As a result, contracting parties as well as the third party may confirm a web page at the time of a contract and compare the web page by using only the total hash value when a dispute arises in the future. In all the processes, the system may be used without membership registration or an authentication procedure and thus has a merit of protecting personal information.

What is claimed is:

1. A method of storing a web page by using a blockchain network, the method comprising:
   receiving, from a first user at a first time, a URL of a web page that the first user wants to store;
   downloading a first HTML file of the web page corresponding to the URL received from the first user, and generating a first image file by rendering the web page through a headless browser;
   temporarily storing the first HTML file and the first image file together with a first timestamp;
   hashing each of the first HTML file and the first image file, and generating a total hash value;
   storing the first HTML file and the first image file in an external file storage by using the total hash value; and
   storing, in the blockchain network, first transaction data including a hash value of the first HTML file, a hash value of the first image file, a file storage path, the first timestamp, the URL, and the total hash value;
   receiving the total hash value from a second user at a second time after the first time;
   after receiving the total hash value from the second user, querying first transaction data corresponding to the total hash value from the blockchain network and receiving the first transaction data from the blockchain network;
   in the case where the first transaction data is received from the blockchain network, downloading a second HTML file of a web page corresponding to a URL of the received first transaction data, and generating a second image file by rendering the web page through a headless browser;
   temporarily storing the second HTML file and the second image file together with a second timestamp;
   hashing each of the second HTML file and the second image file;
   comparing a hash value of the second HTML file and a hash value of the second image file, respectively, with the hash value of the first HTML file and the hash value of the first image file of the received first transaction data; and
   displaying a result of the comparison of the hash values to the second user, wherein
   the total hash value is generated by using a tree together with the hash value of the first HTML file, the hash value of the first image file, the file storage path, the first timestamp, the URL, and a verification status value;
   the first transaction data stored in the blockchain network further includes the verification status value; and
   before receiving the first transaction data from the blockchain network, the verification status value within the first transaction data is first received from the blockchain network, wherein
      in the case where the verification status value is TRUE, an operation of receiving the first transaction data from the blockchain network is performed, and
      in the case where the verification status value is FALSE, the operation of receiving the first transaction data from the blockchain network is not performed.

2. The method of claim 1, wherein the first HTML file and the first image file are not stored in the blockchain network.

3. The method of claim 1, further comprising:
   importing the first HTML file and the first image file from the external file storage by using the file storage path and the total hash value which are included in the received first transaction data, and displaying the imported first HTML file and first image file to the second user.

4. The method of claim 3, wherein the first user and the second user are same or different users, and are a person who provides a service through the web page, a person who uses a service within the web page, or an external verifier.

5. The method of claim 1, further comprising:
   importing the first HTML file and the first image file from the external file storage by using the file storage path and the total hash value which are included in the received first transaction data;
   comparing the first HTML file and the first image file imported from the external file storage with the second HTML file and the second image file; and
   displaying a result of the comparison between the HTML files and the image files to the second user, wherein the comparison between the first image file and the second image file is performed via a deep learning model.

6. The method of claim 1, further comprising:
   after generating the total hash value, generating a status change hash value by salting the total hash value with a random number and then hashing the salted total hash value; and
   transmitting the total hash value and the status change hash value to the first user, wherein the status change hash value is used to change the verification status value.

7. The method of claim 1, further comprising, before hashing the first HTML file and the first image file, displaying the first HTML file and the first image file to the first user and requesting confirmation of the first HTML file and the first image file.

8. The method of claim 1, further comprising performing after the first time periodically:
   downloading a third HTML file of the web page corresponding to the URL, and generating a third image file by rendering the web page through a headless browser;
   temporarily storing the third HTML file and the third image file together with a third timestamp;
   hashing each of the third HTML file and the third image file;
   querying first transaction data corresponding to the total hash value from the blockchain network and receiving the first transaction data from the blockchain network;
   comparing a hash value of the third HTML file and a hash value of the third image file, respectively, with the hash value of the first HTML file and the hash value of the first image file within the first transaction data; and in the case where the hash value of the first HTML file and the hash value of the third HTML file are not the same as each other, or the hash value of the first image file and the hash value of the third image file are not the same as each other, notifying the first user of a hash value mismatch.

9. A system for storing a web page by using a blockchain, the system comprising:
a management server performing the method of claim 1;
the blockchain network; and
the external file storage.

* * * * *